United States Patent [19]

Jukes

[11] 4,325,665
[45] Apr. 20, 1982

[54] THREADED METAL INSERT

[75] Inventor: John A. Jukes, 680 Napa Court, Claremont, Calif. 91711

[73] Assignees: John A. Jukes, Claremont; George Mavriks, San Francisco, both of Calif. ; a part interest

[21] Appl. No.: 130,621

[22] Filed: Mar. 17, 1980

Related U.S. Application Data

[63] Continuation-in-part of Ser. No. 60,765, Jul. 26, 1979, abandoned.

[51] Int. Cl.³ .......................... F16B 39/22; F16B 13/06
[52] U.S. Cl. ................................. 411/176; 29/522 R
[58] Field of Search ............... 411/176, 178, 180, 103, 411/335, 334, 21, 141, 183, 201, 246, 254, 255, 309, 308, 304, 305; 29/522 R, 523

[56] References Cited

U.S. PATENT DOCUMENTS

| | | | |
|---|---|---|---|
| 1,087,299 | 2/1914 | Kennedy | 411/21 |
| 2,099,450 | 11/1937 | Meyer | 411/176 X |
| 3,454,072 | 7/1969 | Dietlein | 411/176 X |
| 3,566,947 | 3/1971 | Jukes | 411/260 |

FOREIGN PATENT DOCUMENTS

| | | | |
|---|---|---|---|
| 716817 | 8/1965 | Canada | 411/178 |
| 736317 | 9/1955 | United Kingdom . | |

*Primary Examiner*—Ramon S. Britts
*Attorney, Agent, or Firm*—Knobbe, Martens, Olson, Hubbard & Bear

[57] ABSTRACT

A tubular metal insert is disclosed having a threaded exterior and an incompletely threaded interior, that is threaded into a tapped hole in a base material by an insert driver tool. Discrete locking plugs are positioned in the threaded exterior of the insert outwardly from the incompletely threaded interior. Rotation of the insert driver completes the threads on the interior portion of the insert which creates a force that urges the discrete locking plugs outwardly into engagement with the walls of the hole to securely lock the insert in the tapped hole.

25 Claims, 8 Drawing Figures

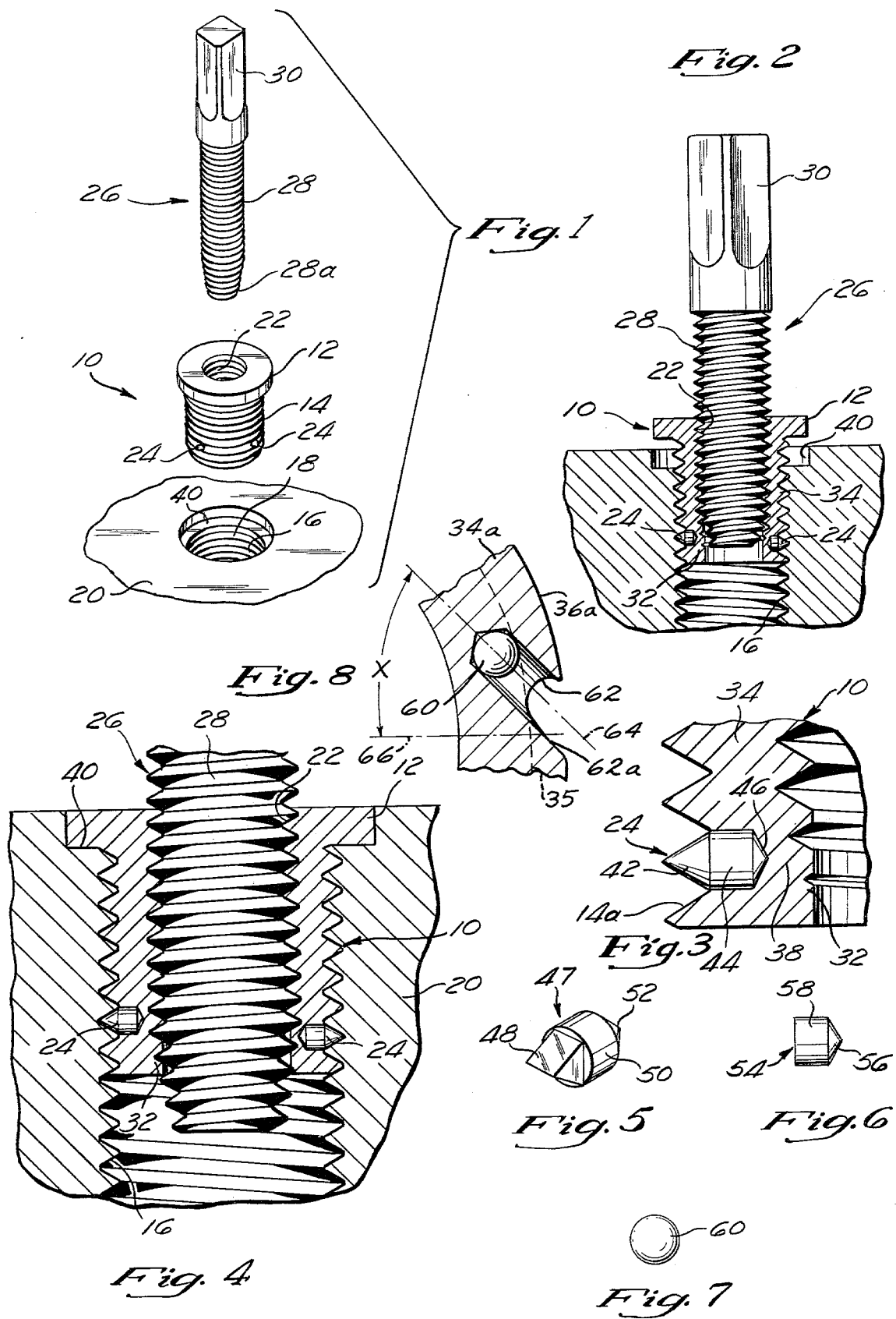

THREADED METAL INSERT

CROSS-REFERENCE TO RELATED APPLICATION

This is a continuation-in-part of U.S. patent application, Ser. No. 60,765, filed July 26, 1979, now abandoned.

BACKGROUND OF THE INVENTION

The invention relates to self-locking threaded inserts which are threaded into a tapped hole to replace or strengthen worn or weakened threads.

Many different inserts have been developed together with various approaches for installing them. One such approach is the use of spiral metal coils threaded into the base material with the coil having a diamond-shaped cross-section. While such coils improve strength they are limited by the size of diamond-shaped wire which must match the pitch of the threaded hole that receives the coil. The approach of threading one wire coil into a prepared hole and then threading another coil into the first one is sometimes used to achieve smaller diameter. This is a tedious and expensive process.

Another system includes the use of a threaded insert having axial slots in its exterior and pins initially attached to the insert near its upper end, to be pounded into the base material after the insert has been threaded into the tapped hole in the base material. As can be appreciated, this system is expensive from both a fabrication and installation standpoint. In addition, the pins sometimes break off before installation, thus rendering the insert unusable, or the pins may deform the thread in the tapped hole.

Inserts having exterior threads which interfere with the threads in the tapped opening of the base material have also been employed, but this solution has been unsatisfactory due to difficulties of installation and reliability of staying in place.

Another approach is described in U.S. Pat. No. 3,566,947, issued to the instant inventor which is incorporated by reference herein. This patent discloses a thin walled threaded metal insert which has a threaded exterior and a partially threaded interior. A threaded tool is then used to position the insert in the tapped hole and complete the thread on the interior portion of the insert. This causes a bulging of the insert walls outwardly to lock the insert in the tapped hole. Although such an insert is quite suitable for many applications requiring thin walled inserts, in other applications, a thick walled insert is required.

Applications requiring a thick walled insert are of two basic types. The first is an insert repair situation in which the threads of an installed insert have been stripped. Such a problem can exist, for example, with inserts used to provide threaded connections for spark plugs. In order to repair the connections, the old thread must be drilled out and the hole counterbored and tapped. This creates a tapped hole of a larger diameter than originally present, which in turn requires an insert of a larger diameter. Since the threaded connection on the spark plug remains the same, the wall of the new insert must be thicker in order that the interior diameter of the new insert be the same as that of the old insert.

The second major type of application for thick walled inserts is an original threaded connection situation in which the depth of the tapped hole is small such as occurs when the base member is thin. Since the depth of the tapped hole is small, in order to create a threaded connection with sufficient strength, the surface area of contact between the tapped hole and the threaded member which is to be inserted in the tapped hole must be increased. This can be accomplished by using a large diameter insert which will increase the pullout strength of the theaded connection. Since the diameter of the screw or bolt which is to be threaded into the tapped hole is of a predetermined size, often the insert must have a thick wall.

These applications requiring thick walled inserts present a special problem to the inserts described in U.S. Pat. No. 3,566,947. This is true because the walls of the inserts are of such a thickness that when the interior thread is completed by a threaded tool, the force created is not sufficient to bulge the insert walls outwardly far enough to lock the insert securely in the tapped hole. The disclosed invention is particularly adapted to solve these problems associated with thick walled inserts.

SUMMARY OF THE INVENTION

In accordance with this invention, there is provided a self-locking insert having a generally tubular shape with substantial portions of the exterior and the interior being threaded. The interior includes a portion which does not have complete threads. Positioned within the exterior thread outwardly from the incomplete threads of the interior are one or more locking plugs. When installing the insert, a threaded insert driver is threaded into the interior of the insert until it engages the incompletely threaded portion of the interior. The insert is then threaded into a tapped hole in a base material until a flanged or outwardly flared head on the exterior of the insert engages the base material. The insert driver is then forceably rotated further to complete the threads in the interior of the insert which creates a force outward against the walls of the insert. This force urges the locking plugs outward more easily than the portion of the insert surrounding the plugs so that the plugs engage the walls of the tapped hole and securely lock the insert in place.

Preferably the apertures in which the plugs are positioned, extend at an angle with respect to a radial line of the insert, when a spherical plug is used. This cams a spherical plug to engage more tightly the walls of the tapped hole, whe torque is applied to attempt to remove the insert.

BRIEF DESCRIPTION OF THE DRAWINGS

FIG. 1 is an exploded perspective view of the invention insert together with the insert driving tool and base material;

FIG. 2 is a side view partially in cross-section showing the insert being threaded into the tapped hole of the base material by the insert driving tool;

FIG. 3 is an enlarged fragmentary view of one side of the base of the insert of FIG. 2 with the insert driving tool removed;

FIG. 4 is an enlarged fragmentary view of the insert threaded into the base material by the insert driving tool but before the internal thread is complete;

FIG. 5 is a perspective view of a locking plug having a chisel top, cylindrical center, and conical base;

FIG. 6 is a side view of a locking plug having a cylindrical top and conical base;

FIG. 7 is a perspective view of a locking plug of a spherical shape; and

FIG. 8 is a fragmentary cross-sectional view of an insert having a spherical plug in an aperture extending non-radially.

DETAILED DESCRIPTION OF THE PREFERRED EMBODIMENTS OF THE INVENTION

Referring first to FIG. 1, there is shown a tubular insert 10 having an annular body made of stainless steel or cold rolled steel. The upper end of the insert 10 is formed with an outwardly flared head 12 on its exterior. A substantial portion of the exterior of the insert 10 is formed to threadably mate with a thread 16 formed in a tapped hole 18 in a base material 20.

The base material 20 can be formed from a variety of substances, such as aluminum, magnesium, or steel.

The interior of the insert 10 is formed with a thread 22 which extends only partially along the entire length of the insert 10 as will be more fully described later. The insert 10 has locking plugs 24 which are discrete from the insert 10 and which are shown positioned within the exterior threads 14. The locking plugs 24 are preferably of material harder than the base material 20 so that they will be better able to penetrate the base material 20 and provide good locking action; however, considerable locking can be obtained with plugs somewhat softer than the base-. For example, aluminum plugs are in some applications suitable for use with a cast iron base.

Also shown in FIG. 1 is an insert driver tool 26 which is a known item and has a thread 28 formed on one end with the bottom-most turns 28a of the thread being of decreasing diameter. The basic diameter and pitch of the thread 28 is the same as the interior thread 22 of the insert. The insert driver tool 26 is formed of steel and is designed to cold form threads without producing chips even in such hard materials as stainless steel. The upper end 30 of the insert driver tool 26 has wrenching flats to facilitate turning with a wrench.

The interior of the insert 10 is shown more clearly in FIG. 2 in which the interior thread 22 is shown extending from the flared head area 12 downwardly to a lower portion 32 which is formed with an incomplete thread. The term incomplete thread as used herein encompasses both imperfect thread and no thread. In machining the interior thread 22, it is easier to leave an imperfect thread than no thread at all. The incompletely threaded portion 32 extends for an axial distance of about one or two thread turns and preferably no more than three turns.

As shown in the preferred embodiment of FIG. 2, the pitch of the interior thread 22 on the threaded portion is less than the pitch of the exterior thread 14. As shown, the interior thread 22 is not radially aligned, i.e., timed, with the exterior thread 14. If desired, the threads may be timed.

Referring now to FIG. 3, there is shown an enlarged fragmentary view of a portion of the insert 10 showing the incompletely threaded portion 32. A plug 24 is shown positioned in the wall 34 of the insert 10. In order to position the plug 24 in the wall 34 of the insert 10, an aperture is drilled into the insert 10 at the bottom few exterior threads 14a of the insert 10. The hole is drilled at a location along the depth of the insert where the hole is positioned radially outward from the incompletely threaded portion 32 of the insert 10. Advantageously, the holes are drilled into the crest 36 of the exterior thread 14a. Also advantageously, the aperture which holds the plug 24 does not extend completely through the wall 34 of the insert 10, thereby creating a socket with a wall portion 38 of reduced thickness between the plug 24 and the incompletely threaded portion 32. This wall portion 38 serves to prevent the plug 24 from moving into the threaded holes of the insert 10.

The plug 24 can be held in the aperture by an adhesive or mechanically by staking or interference fit so that it remains in place until the insert 10 is used. One or more plugs can be used, the number depending upon the amount of additional locking strength which is required for the insert 10. For most applications, no more than four plugs would be required.

To install the insert 10 into the base material 20, the insert driver tool 26 is first freely threaded into the insert up to the point where the full diameter turn of the insert driver threads 28 engage the incompletely threaded portion 32 of the insert, as shown in FIG. 2. The insert 10 is completely threaded into the tapped hole 18 in the base material 20 up to the point where the outwardly flared head 12 of the insert 10 engages the upper end of the countersink 40 of the tapped hole 18, preventing further inward movement of the insert 10. The inward movement of the insert 10 could also be limited by engagement of the end of the insert with the bottom of the tapped hole 18, although this is not the usual arrangement.

Referring now to FIG. 4, by forceably rotating the insert driver tool 26 an additional amount, the insert driver thread 28 cold forms the incompletely threaded portion 32 of the insert 10 to complete the thread 22 to the bottom of the insert 10.

Completing the thread of the portion 32 creates a force which is directed outward toward the walls of the tapped hole. Since wall portion 38 behind the plug is of a much reduced thickness compared with the portion of the insert surrounding the plug having the thickness of the wall 34, the outward force will more easily urge the portion 38 outwardly and thus urge the locking plug 24 outward and into the walls of the tapped hole. The locking plug will also move outward more easily than the adjacent insert material since it is a discrete entity from the insert 10 itself. The locking plug 24 being of a harder material than the base material 20 has a tendency to penetrate the walls of the tapped hole 18 thereby providing secure locking of the insert within the base material 20. Thus, the thickness of the wall 34 is such that its response to the outward force created by the completion of the threads of the interior is insufficient to securely lock the insert within the tapped hole 18. The locking plugs 24 provide the additional necessary locking action.

The insert driver tool 26 may be easily backed out of the insert 10 by being rotated in the opposite direction and the insert 10 will remain firmly locked in place in the base material 20. Instead of using an insert driver tool 26, a hardened machine screw which might be used as the permanent fastening member can be used to complete the incompletely threaded portion 32 in the insert 10. In this case, the screw could be removed from or left in the insert 10 as desired.

The particular locking plug shown in FIGS. 2 through 4 has a conical top 42, a cylindrical center 44, and a conical base 46. When installing the locking plug in the drilled aperture, the conical base 46 is seated in the aperture with the apex of the cone directed toward the incompletely threaded interior portion 32. The apex of the conical top 42 is therefore directed away from the incompletely threaded interior portion 32 toward the walls of the tapped hole 18.

Reference is made now to FIGS. 5, 6, and 7, in which are shown three additional types of locking plugs. FIG. 5 shows a preferred plug 47 which has a chisel top 48, a cylindrical center section 50, and a conical base section 52. In order to position the plug 47 into the wall 34 of the insert 10, the conical base section 52 is inserted into the aperture with the apex of the cone directed toward the incompletely threaded portion 32. The point of the chisel top will thereby be directed toward the walls of the tapped hole 18. Substantially all of the drilled hole will be filled by the conical base 52 and a portion of the cylindrical center 50 which is aligned coaxially with the aperture. Advantageously, the chisel top 48 is aligned with the crest 36 of the exterior threads 14a of the insert 10. This alignment makes it less likely that the plug 47 will interfere with the threading of the insert 10 in the tapped hole 18. In addition, the chisel top 48 allows the plug 47 to more easily penetrate the walls of the tapped hole 18.

Referring to FIG. 6, there is shown another type of locking plug 54 having a conical base 56 and a cylindrical section 58. The locking plug 54 is therefore quite similar to the locking plug 47 shown in FIG. 5 except that it lacks the chisel top 48. The plug 54 would be inserted into the wall 34 of the insert 10 in the same manner as described above.

Finally, FIG. 7 shows a third type of locking plug 60 which has a spherical shape. Ball-shaped plugs do not have the advantage of a somewhat sharp edge to help locking into the base material, as do the other plugs, but they are readily available and less expensive. They also need not be oriented in installation. Further, it has been found that improved locking can be obtained by positioning ball-shaped plugs in apertures that are non-radially oriented.

Referring to FIG. 8, there is shown in cross-section a fragment of an insert wall 34a, which is like that of the insert wall 34 except that the aperture or socket 62 in which the ball-shaped plug 60 is positioned is non-radially oriented. That is, the socket 62 is drilled on an axis 64 that is at an angle X, preferably about 45°, with respect to an intersecting line 66 which is a radius of the insert wall 34a. The socket 62 is drilled through the crest 36a of the outer thread of the insert. The dotted line 35 represents the root of the exterior thread. The open outer end of the socket 62 is shown with a curved configuration on its side because the drilling of the socket cuts through the flanks of the exterior thread.

FIG. 8, shows the plug 60 and the insert 34a before the insert has been installed in the base material. As can be seen, the size of the plug 60 with respect to the socket is such that the plug can be located in the lower end of the socket essentially inwardly from the root diameter 35. This insures that the spherical plug 62 does not interfere with threading the insert into the base material. If the socket were shallower, the spherical sides of the ball would protrude beyond the flanks of the thread and thus interfere with the installation of the insert.

In utilizing the tool 30 to complete the thread on the inner wall of the insert 34a, the spherical plug 60 is forced outwardly in the opening 62 in essentially the same manner as described above with respect to the other plugs. That is, the plug 60 is forced outwardly to penetrate to some extent the surrounding base material, and thus lock the insert in the base material. The significance of the non-radial opening 62 is recognized when considering the situation when torque is applied to the insert to attempt to unthread or back out the insert from the base material. The insert 34a is installed into the base material by rotating it in a clockwise direction, as viewed in FIG. 8. Thus, the open end of the socket 62 might be said to open or face in the clockwise direction or in the insert installing direction. When the interior thread is completed, the plug 60 is forced outwardly in the socket 62 protruding partially beyond the flanks and crest 36a of the exterior thread into forcing contact with the base material. If in that condition, a counterclockwise or backout torque is applied to the insert in an attempt to back it out, the ball-shaped plug 60 is forced against the longer wall 62a of the socket, and due to the angular orientation of the socket wall 62a, the ball plug 60 is cammed outwardly further into the base material thus tending to lock the insert more tightly into position and tending to resist the counterclockwise rotation of the insert. Thus, by the simple expedient of drilling the socket 62 in a non-radial orientation with the open end of the socket extending in the direction for installing the insert, more reliable locking of the insert in the base material is obtained.

From the foregoing, it can be appreciated that the insert 10 can be fabricated by standard machine operation and can be easily and quickly installed into the base material 20 requiring only simply tapped hole preparation.

I claim:

1. A self-locking threaded insert having a tubular body which is threaded into a tapped hole in a base member comprising:
    an exterior of said body having threads that mate with threads of said tapped hole;
    an interior of said body having a portion which is threaded and a portion which is incompletely threaded; and
    means for locking said insert to the walls of said hole, said locking means being discrete from said insert and positioned in the exterior of said insert outwardly from the incompletely threaded interior portion, so that said locking means will be forced outwardly to engage the wall of said hole when said incompletely threaded interior portion is threaded while in said hole.

2. The insert of claim 1 wherein a portion of the body which surrounds said locking means and which includes said incompletely threaded interior portion is of sufficient radial thickness that said locking means is urged outward more easily than said surrounding portion when said incompletely threaded interior portion is threaded.

3. The insert of claim 1 wherein said locking means is formed of a harder material than the material of said base member.

4. A self-locking threaded insert having a tubular body which is threaded into a tapped hole in a base member comprising:
    an exterior of said body having threads that mate with threads of said tapped hole;
    an interior of said body having a portion which is threaded and a portion which is incompletely threaded; and
    means for locking said insert to the walls of said hole, said locking means being discrete from said insert and positioned in an aperture in said exterior of said body outwardly from the incompletely threaded interior portion, said aperture not extending completely through said incompletely threaded portion thereby leaving material between said locking means and said incompletely threaded interior portion, so that said material will be forced outward when said incompletely threaded portion is threaded while in the hole, which will in turn force said locking means to engage the wall of the hole to lock said insert in said hole.

5. The insert of claim 4 wherein the depth of said aperture in said exterior of said body is such that said locking means will be more easily forced outward by the threading of the incompletely threaded portion than a portion of the body surrounding said locking means.

6. The insert of claim 1 wherein said locking means is positioned in a crest of the thread of said exterior.

7. The insert of claim 1 wherein said exterior threads and said interior threads are timed.

8. The insert of claim 1 wherein said locking means comprise one or more plugs, each of said plugs substantially filling an aperture that extends into said exterior.

9. The insert of claim 8 wherein at least one of said plugs is of a generally spherical shape.

10. The insert of claim 8 wherein at least one of said plugs has a base generally in the shape of a cone and a portion generally in the shape of a cylinder, said cone having an apex directed toward said incompletely threaded portion and said cylinder being oriented coaxially with said aperture.

11. The insert of claim 8 wherein at least one of said plugs has conically shaped ends, one having an apex directed toward said incompletely threaded portion and the other having its apex directed away from said incompletely threaded portion.

12. The insert of claim 8 wherein at least one of said plugs has a base seated in said aperture and a chisel-like top directed away from said incompletely threaded interior portion.

13. The insert of claim 12 wherein said plug is positioned in a creat of said exterior thread.

14. The insert of claim 13 wherein said chisel-like top is aligned with the remainder of the crest of said exterior thread.

15. A self-locking threaded insert having a tubular body which is threaded into a tapped hole in a base member comprising:
an exterior of said body having threads that mate with threads of said tapped hole;
an interior of said body having a portion which is threaded and a portion which is completely threaded; and
means for locking said insert to the walls of said hole, said locking means being discrete from said insert and including a ball-shaped plug positioned in a socket in the exterior of said insert outwardly from the incompletely threaded interior portion, said socket being oriented at an angle which will cause said ball to be cammed outwardly when a torque is applied to said insert to back it out of said tapped hole once said ball has been forced outwardly to engage the wall of said hole when said incompletely threaded interior portion is threaded while in said hole.

16. In a self-locking insert for installation into a base material comprising a tubular body, said body having an exterior which is threaded and an interior which has a portion which is threaded and a portion which is incompletely threaded so that said insert can be installed into a tapped hole by a threaded tool which completes the incompletely threaded portion of said insert and creates a force outward towards said base material, the improvement comprising:
discrete locking means positioned in said exterior radially outward from said incompletely threaded portion, so that said locking means can be urged outward into said base material more easily than that portion of the insert which surrounds said locking means when said incompletely threaded portion is completed to lock said insert securely in place.

17. A self-locking insert for installation into a base material comprising:
an annular body having an exterior which is threaded and an interior having a portion which is threaded and a portion which is incompletely threaded, said insert having locking means positioned in the exterior of said body radially outwardly from but not completely through said incompletely threaded interior portion thereof forming a portion of said body of a reduced thickness located between said locking means and the interior of said body;
a portion of the body which has its original thickness and which includes said incompletely threaded interior portion being sufficiently thick that its response to an outward force created by a threaded tool completing the thread of said incompletely threaded interior portion would be insufficient to lock said insert in the hole; and
said portion of the body having reduced thickness being sufficiently thin that it will urge said locking means outward in response to said force to engage the wall of said hole and to lock said insert in said hole.

18. The combination of claim 17 wherein said locking means includes a spherical plug positioned in a socket in the exterior of said buldged portion, with the axis of said socket extending at an angle with respect to the radius of said insert passing through said axis such that said plug is cammed outwardly towards said base material by a wall of said socket in the event said insert is rotated in a direction to attempt to back the insert out of said tapped hole.

19. The combination comprising:
(a) a base material having a tapped hole
(b) a threaded insert having a tubular body threaded into said hole, said insert having a portion of said body bulged outwardly toward the wall of said hole by threads formed therein; and
(c) locking means, separate from said insert body, positioned in an exterior aperture in said insert bulged portion and extending outwardly therefrom into forcible engagement with the wall of said hole to lock said insert in said hole.

20. A self-locking insert for installation into a base member comprising:
a tubular body having an upper interior portion which is threaded and a lower interior portion which is incompletely threaded;
a socket formed in the exterior of said tubular body radially outwardly from said incompletely threaded interior portion with the open end of the socket opening to the exterior of said body; and
a locking plug installed in said socket having an outer end terminating adjacent the exterior of the tubular body and an inner end engaging the bottom of the socket, the portion of said body extending between the bottom of the socket and the inner surface of said incompletely threaded portion being sufficiently thin that it is forced outwardly and thus forces the locking plug outwardly when a tool is threaded into the body completing the thread on the incompletely threaded portion.

21. The insert of claim 20 wherein the axis of said socket is oriented so that the plug is cammed outwardly by one of the socket walls if a torque is applied to an installed insert in a direction to back the insert out of a hole in said base member.

22. The insert of claim 21 wherein said axis extends at an angle with respect to a radius of said tubular body passing through said axis, with the open end of the socket facing in the general direction that said insert is rotated when it is to be installed in a threaded hole.

23. A method for installing a self-locking threaded insert into a tapped hole in a base material, said insert having a tubular body with a threaded exterior and an interior with a threaded portion and an incompletely threaded portion, and having a locking means discrete from said insert positioned in the exterior of said body, comprising the steps of:

threading said tubular insert onto the exterior of a threaded member, said insert being initially threaded onto the threaded member no further than where it can be easily turned, to a position where said unthreaded interior portion engages the threaded member;

threading the insert into the tapped hole of said base material to a point where it can be threaded no further because of interference between the insert and the base material; and forming threads in the incompletely threaded interior portion of said insert with said threaded member to force said discrete locking means outward to engage the walls of said tapped hole and thereby lock said insert in place.

24. The insert of claim 16 wherein said lock means is composed of a harder material than said base material.

25. The insert of claim 1 wherein said locking means is positioned in the exterior of said insert body so that said incompletely threaded interior portion of the insert will be forced outward when said incompletely threaded portion is threaded while in the hole, which will in turn force said locking means to engage the wall of the hole to lock said insert in said hole.

* * * * *